United States Patent [19]

Kendrick

[11] 4,111,066

[45] Sep. 5, 1978

[54] CONTROL MEANS

[75] Inventor: Frank B. Kendrick, Franklin, Pa.

[73] Assignee: Joy Manufacturing Company, Pittsburgh, Pa.

[21] Appl. No.: 740,579

[22] Filed: Nov. 10, 1976

[51] Int. Cl.² .............................................. G05G 9/00
[52] U.S. Cl. ...................................... 74/471 R; 74/417
[58] Field of Search ................ 74/471 R, 471 XY, 417

[56] References Cited

U.S. PATENT DOCUMENTS

| 1,541,052 | 6/1925 | Hunt | 74/471 R X |
|---|---|---|---|
| 1,869,326 | 7/1932 | Ludlow | 74/471 R |
| 2,038,943 | 4/1936 | Fountain | 74/471 R |
| 2,191,842 | 2/1940 | Back | 74/471 XY |
| 2,313,768 | 3/1943 | Putt | 74/471 R |
| 2,407,322 | 9/1946 | Morrison | 74/471 R |
| 2,439,393 | 4/1948 | Kerr | 74/471 R |
| 2,618,447 | 11/1952 | Le Carme | 74/471 R X |
| 3,611,827 | 10/1971 | Bottum et al. | 74/471 XY |
| 3,625,302 | 12/1971 | Lauck | 74/471 XY |

Primary Examiner—Allan D. Herrmann
Attorney, Agent, or Firm—J. Stewart Brams

[57] ABSTRACT

This invention relates to improved traction control means for a mobile vehicle such as a tractor or excavating machine having a pair of laterally spaced, endless crawler tracks, each of which is powered independently by its own traction motor for generally curvilinear travel of the vehicle at variable speeds in either the forward or reverse direction.

6 Claims, 4 Drawing Figures

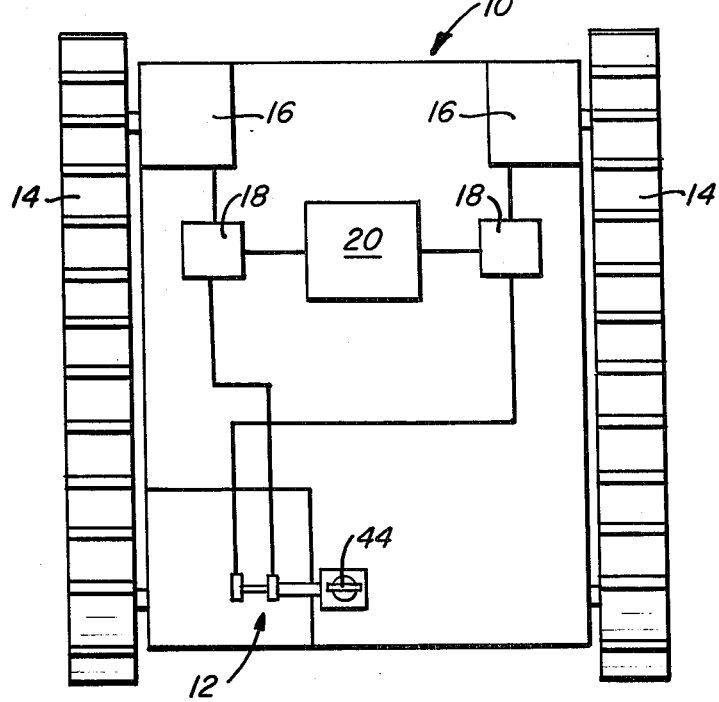
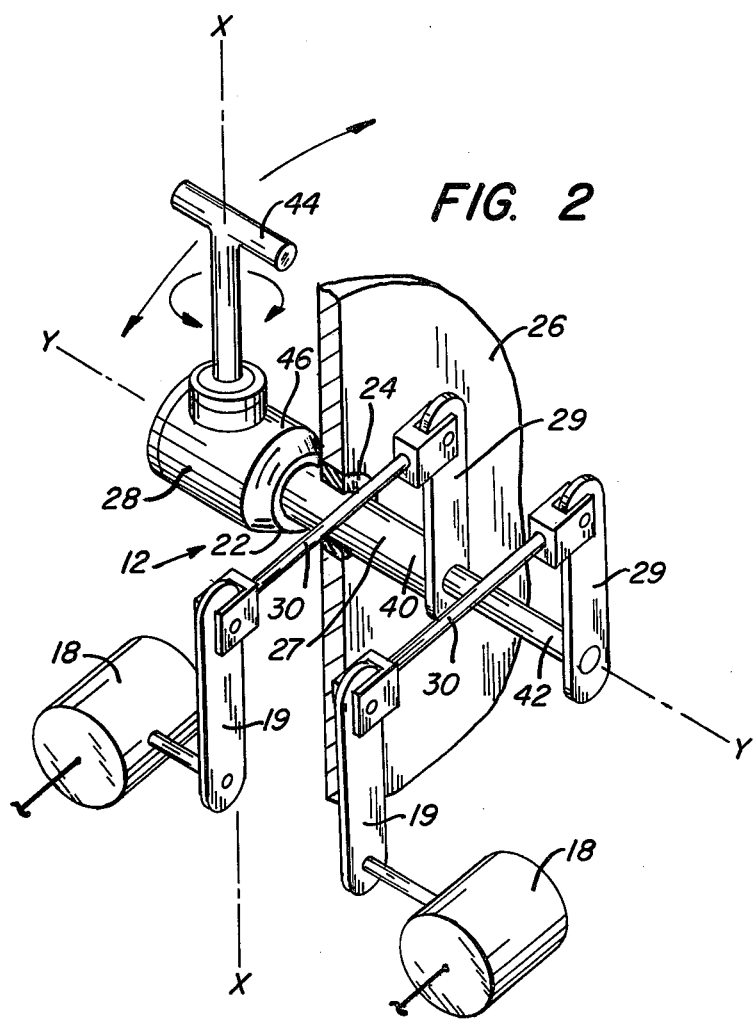

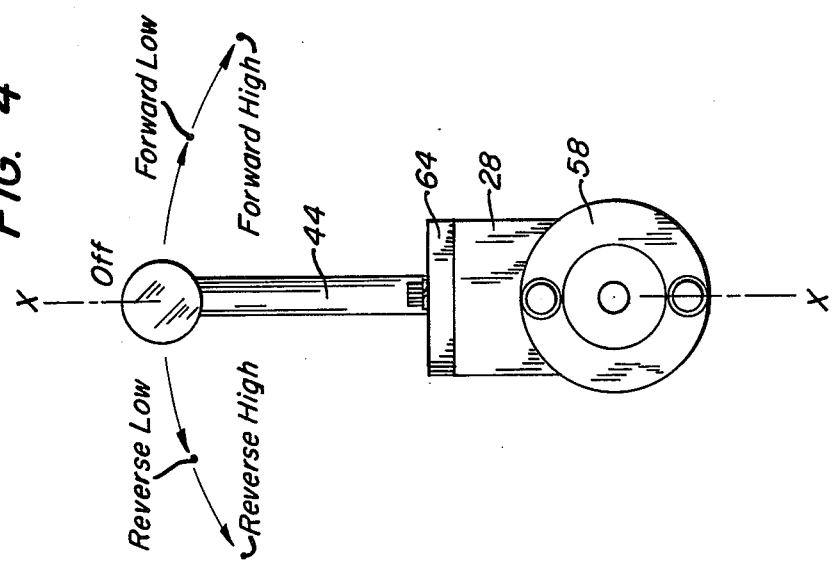
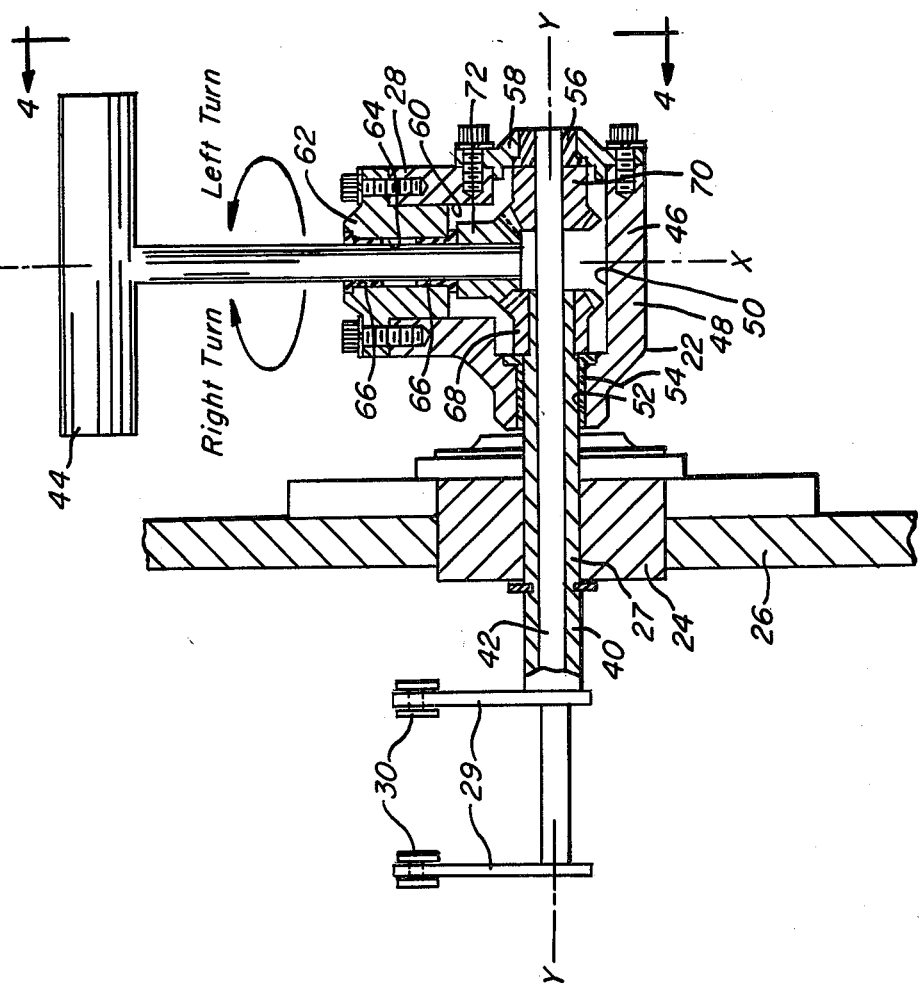

CONTROL MEANS

It has been known in the prior art to drive the crawler tracks of such a track equipped vehicle in the same direction at the same speed for straight line vehicular motion in the forward and reverse directions and to drive one crawler track at a different speed and/or in the opposite direction from the other crawler track for differential track movement and consequent vehicular turning motion. To achieve such crawler track operation the prior art has often provided a separate control lever or handle for independent actuation of each traction motor. Such multiple control lever arrangements have not been entirely satisfactory in that their control movements often have not borne any logical or natural relationship to the vehicle motions produced thereby and operator confusion has thus resulted. Confusion has often been aggravated by the mere presence of multiple traction motor controls since the vehicle may in practice be a complex machine, an underground continuous miner for example, and the operator thereof often may be required to attend to various other machine functions in addition to operation of the traction controls. Thus, to the extent that the operator is distracted by other requirements of machine operation, unnecessarily complex and confusing traction control arrangement may be extremely hazardous.

As an improvement over such multi-lever traction control arrangements it has been proposed in the prior art to gang the multiple traction controls together as a "joy-stick" type of control, for example as shown in U.S. Pat. No. 3,323,607, wherein a single control lever is movable simultaneously in mutually perpendicular directions to control the vehicle motion. Accordingly, forward and rearward movement of the conventional joy-stick causes the vehicle to move in the forward or reverse direction while sideways movement of the joy-stick drives the respective traction motors differentially to steer the vehicle. The joy-stick, however, also has been unsatisfactory in that the control movements of the joy-stick, like those of multi-lever traction controls, are not in all cases consistent with the vehicular motion produced thereby. For example, in some conventional joy-stick control arrangements the control movements required for turning the vehicle in a given direction when backing the vehicle may be reversed from those required for turning the vehicle in the same direction when moving forward.

Still another proposed traction control which is similar in some respects to the conventional joy-stick comprises a single, elongated control lever or handle which is movable in the forward and rearward directions for straight line vehicular motion and is rotatable about its longitudinal axis for steering the vehicle. Such single lever controls, as shown in U.S. Pat. No. 3,876,020 for example, are referred to hereinafter as a "modified joy-stick." The modified joy-stick generally is considered preferable to the conventional joy-stick as described hereinabove in that the control movements thereof are logical, natural and consistent. The operator's task is thus greatly simplified and vehicle operating safety and efficiency are correspondingly improved. However, the deficiencies of known modified joy-sticks have partially offset their advantages. For example, many modified joy-sticks have been capable of performing the required traction control functions only through a relatively complex system of articulated linkages which in some cases have been insufficiently reliable and durable for use in harsh environments. Furthermore, such modified joy-stick linkage arrangements typically have included lever arms operatively connected to or carried by an axially extending portion of the control handle and extending transversely in opposite direction therefrom whereby a major axial extent of the control handle has of necessity been surrounded on all sides by a large enclosure which houses the operatively connected links and lever arms. This has limited the available options of control installation. For example, such modified joy-sticks, like conventional joy-sticks, have not heretofore been capable of being mounted on a vertical sidewall or bulkhead portion of the vehicle.

According to the present invention, there is provided an improved modified joy-stick which employs the hereinabove described single lever control concept for logical and natural control movements and which additionally is of considerably simplified design. The improved design provides among other advantages, compactness, significantly enhanced durability and reliability over complex linkage arrangements and a variety of installation options including mounting of the control on a vehicle sidewall or bulkhead. In one preferred embodiment thereof, the traction control of the present invention comprises a single control lever or handle operatively connected by control means to a pair of traction motors and mounted for movement in the forward and rearward directions to operate the traction motors concomitantly for forward or reverse vehicular travel. The control lever is also mounted for rotation about its central longitudinal axis to provide differential manipulation of the operably connected control elements and the respective traction motors for vehicle turning motion. The operatively connected control elements of this invention preferably include a bevel gear arrangement of considerably improved durability, simplicity, and compactness over prior controls. Accordingly, it is an object of this invention to provide improved traction control means for a vehicle having independently powered or operable endless crawler tracks or other ground engaging, powered traction means.

Another object of the invention is to provide an improved traction control means wherein the control movement thereof corresponds naturally and logically to the vehicle movements produced thereby.

A further object of the invention is to provide a traction control means of improved simplicity, compactness and durability.

Another object of the invention is to provide a single lever traction control system of the hereinabove defined modified joy-stick type which includes meshed gear means operatively connecting the single control lever to other control elements wherein the control lever is movable about a first rotational axis which is perpendicular to the longitudinal axis thereof, and about its longitudinal axis to provide all required traction motor operating modes.

Yet another object of the invention is to provide a vehicle single lever traction control means which may be mounted adjacent a vertical sidewall or bulkhead portion of the vehicle.

These and other objects and advantages of this invention are more fully specified in the following description with reference to the accompanying figures in which:

FIG. 1 is a schematic plan view of a vehicle including traction control means of this invention;

FIG. 2 is a perspective view of a control means constructed according to one embodiment of the instant invention;

FIG. 3 is a central longitudinal section of FIG. 2 taken on a plane containing axes X—X and Y—Y shown in FIG. 2; and FIG. 4 is a side elevation of the control means as it would appear from line IV—IV of FIG. 3.

There is generally indicated at 10 in FIG. 1 a mobile vehicle such as an excavation machine or the like which includes control means generally indicated at 12 and constructed according to one embodiment of the instant invention. Vehicle 10 includes traction means such as a pair of laterally spaced, endless crawler tracks 14 which are independently powered by any suitable motive means, for example respective hydraulic motors 16 which are driven by respective reversible, variable displacement pumps 18. Pumps 18 in turn are powered by a single engine 20 and are controllable by manipulation of control means 12 for selective variation of pump 18 displacement and flow direction to actuate motors 16 for powering crawler tracks 14 in the well known manner.

Referring to FIG. 2, control means 12 is shown as comprising a traction control lever assembly 22 which is rotatably supported by a bearing means 24 mounted within a vertical sidewall or bulkhead portion 26 of vehicle 10 in such manner that a control handle portion 28 of assembly 22 is located adjacent one side of wall 26 and is operatively connected to a pair of spaced control levers or cranks 29 spaced outwardly from the opposite side of wall 26 by means of an intermediate control assembly portion 27 extending on an axis Y—Y which intersects the plane of wall 26. The intermediate portion 27 is rotatably supported within bearing 24 whereby the entire assembly 22 is supported for rotation about axis Y—Y. For purposes of simplicity, each crank 29 is shown in FIG. 2 as being operatively connected directly to an actuator portion 19 of one of the pumps 18 by means of an elongated link element 30 pivotally connected thereto and extending therebetween. It will be appreciated that the hereinabove described operative connections between cranks 29 and pumps 18 may take any suitable form inclusive of fluid, electrical and mechanical operative connections as well as various suitable combinations thereof.

Referring to FIGS. 2 and 3, the intermediate portion 27 of assembly 22 includes an elongated, tubular outer shaft 40 which is journaled in bearing 24 and extends therethrough and an inner shaft 42 which extends coaxially within outer shaft 40 and is rotatable with respect thereto. Inner shaft 42 extends further axially inward (to the left in FIG. 3) than does shaft 40 and the respective axially inner ends of shafts 40, 42 each have one of cranks 29 suitably, rigidly affixed thereto. From the description hereinabove it will be seen that by concomitant rotation of shafts 40, 42 the pumps 18 are actuated identically for substantially uniform actuation of crawler tracks 14 as required for forward or rearward straight line vehicular travel, and by relative rotation of the respective shafts 40, 42 the respective pumps 18 are differentially actuated as required for vehicular turning motion.

Control lever portion 28 comprises a generally T-shaped elongated lever or handle 44 which is retained in operative engagement with the axially outer end portions of the respective shafts 40, 42 by a formed housing portion 46 which encloses the adjacent ends of the shafts 40, 42 and handle 44. Housing 46 includes a body 48 having a stepped through bore 50 which receives the outer axial ends of shafts 40, 42 coaxially therewithin. A reduced diameter axial end portion 52 of bore 50 has disposed coaxially therewithin a rotary bearing means 54 which closely slidably encompasses shaft 40. In similar fashion a bushing or bearing means 56 is carried by an end cap 58 which is releasably affixed coaxially adjacent the opposite axial end of bore 50 and the axially outer end of shaft 42 is closely slidably received within bushing 56 whereby housing body 48 is supported by shafts 40, 42 and is rotatable with respect thereto about axis Y—Y. Body 48 further includes an upwardly opening bore 60 which intersects bore 50 and has an elongated end cap 62 releasably secured within the upper end thereof. A coaxial bore 64 formed in cap 62 has disposed therewithin rotary bearing means 66 which slidably, rotatably receives the lower axial end of handle 44 therewithin such that in the assembled structure the lower extremity of handle 44 is juxtaposed with portions of shafts 40, 42 within body 48.

The axial end of shaft 40 within body 48 has a bevel gear 68 suitably, nonrotatably secured thereto axially adjacent the inner end of bore portion 52 as by splined engagement, a press fit or set screws, for example. In similar fashion, shaft 42 also has a bevel gear 70 with the same number of teeth as gear 68 non-rotatably secured thereto adjacent the inner end of bushing 56. The gears 68, 70 are axially spaced apart and disposed with the respective toothed portions thereof generally facing axially toward each other to cooperably mesh with a bevel gear 72 which is similarly secured to the lower end portion of handle 44 and adjacent the inner end of cap 62. The meshing gears 72, 70 and 68 permit manipulation of shafts 40, 42 by handle 44 in a manner to be described hereinbelow to provide a greatly simplified form of the hereinabove defined modified joy-stick control.

It will be appreciated that the enlarged diameter of each bevel gear 72, 70 and 68 axially opposite the toothed ends thereof provides a thrust bearing surface which is cooperable with respective thrust bearing portions of bearing means 66, 56 and 54, respectively, to captively retain housing 48 with respect to shafts 40, 42 and handle 44 with the bevel gears 72, 70, 68 captively enmeshed together as described hereinabove.

With reference to FIGS. 3 and 4 it will be seen that for linear vehicular travel handle 44 is moved about axis Y—Y from a central or non-actuating position indicated in FIG. 4 by the word "off". Inasmuch as handle 44 is keyed or interlocked with both shafts 40, 42 by the described enmeshment of bevel gears 72, 70, 68, moving handle 44 toward the forward and reverse operating positions rotates shafts 40, 42 concomitantly for substantially identical actuation of pumps 18 and thus of tracks 14 to produce the desired forward or rearward linear vehicular travel. Thus, by pushing handle 44 forward from the off position the operator may select forward low or high speed actuation of tracks 14 and similarly, by pulling handle 44 backward from the off position he may select reverse low or high speed actuation. To turn vehicle 10 pumps 18 are differentially actuated by relative rotation of shafts 40, 42 as handle 44 is rotated about axis X—X. For example, by rotating handle 44 in the clockwise direction for a right turn as shown in FIG. 3, the meshing of bevel gears 72, 70 and 68 causes shaft 40 to rotate toward forward actuation positions and shaft 42 to rotate toward the reverse actuation positions. Accordingly, differential actuation of pumps 18 results whereby the vehicle 10 turns right in the usual manner. In a like manner left turns are negotiated by rotating of the handle 44 counter-clockwise about axis X—X.

It will be appreciated that in the disclosed embodiment of the invention the left hand crank 29 (as seen in FIG. 1) must be operatively connected to the right hand pump 18, and the right hand crank 29 to the left hand pump 18. If this crossover control arrangement were not used in the disclosed embodiment, rotation of handle 44 in a given sense about axis X—X would cause vehicle 10 to turn in the opposite sense. This is due to the shaft 40 being shorter than shaft 42 whereby the crank 29 affixed to shaft 40 is the right hand one of the two cranks 29. Thus, rotation of handle 44 to the right relatively advances shaft 40 with respect to shaft 42. Since a right turn requires the right track 14 to move at a relatively slower rate than the left track 14 (with respect to forward motion) the relatively advancing control action of right crank 29 must actuate left track 14 while the relatively retarding control action of left crank 29 actuates right track 14. In a symmetrical variation of the embodiment of FIG. 3 the shafts 40, 42 may extend to the right from lever portion 28 whereby the crank 29 carried by shaft 40 becomes the left hand rather than the right hand crank 29, and use of the described crossover connection is thus unnecessary. In general, the turning of handle 44 about axis X—X produces a relatively advancing control action in one of shafts 40, 42 with respect to the other shaft. In all cases, these control actions must be associated with the proper pump 18 to provide vehicle turning which is consistent with the movements of handle 44 as described hereinabove.

Of course, handle 44 may be operated simultaneously for forward and reverse vehicular travel and for turning motion to provide complete control over vehicle movements. For example, if it is desired to move vehicle 10 forward and to the right, the operator pushes handle 44 toward the forward operating modes and rotates it in the clockwise direction to select, for example, left track 14 in forward high and right track 14 in forward low. For a right turn with substantially no forward motion of the vehicle 10, the operator may select the same degree of clockwise turning of handle 44 about axis X—X with a lesser forward shift thereof to actuate left track 14 in forward low while right track 14 remains off. In an entirely similar manner, the operator may select forward left turning travel or reverse linear, left turning or right turning travel. In addition, by rotating handle 44 about axis X—X in either the clockwise or counter-clockwise direction without moving handle 44 from the off position, the operator may select left track 14 in a forward mode and right track 14 in a reverse mode for turning vehicle 10 in confined spaces where little or no linear travel is possible.

According to the description hereinabove there is provided by the instant invention an improved single lever traction control means having simplified, durable and compact construction and natural, logical control movements, which is capable of installation in a variety of configurations including mounting thereof on a vertical sidewall or bulkhead. Notwithstanding the description herein of a particular preferred embodiment, the invention may be practiced in various alternative embodiments without departing from the broad spirit and scope thereof. For example, handle 44 may be provided with a formed knob adjacent the upper end thereof in lieu of the described T-bar; the operative connection between shafts 40, 42 and the respective pumps 18 may take any of a wide variety of desirable forms; the discrete low and high speeds may be substituted by continuous speed ranges; an automatic return to off or so called dead-man feature may be provided; and the like.

These and other embodiments and modifications having been envisioned and anticipated by the inventor, the invention should be construed as broadly as permitted by the scope of the claims appended hereto.

I claim:

1. A manually operable control means adapted for selectively actuating at least a pair of actuatable means associated with a motive means, said control means comprising: an elongated control handle portion having a longitudinal axis; elongated rotary actuator means cooperable with such a pair of actuatable means and extending transversely with respect to said longitudinal axis of said handle portion; connecting means operatively connecting said handle portion to said actuator means and including means for locating said handle portion adjacent one longitudinal end of said actuator means and rotary connector means cooperable with said handle portion and said actuator means; said operative connection providing axial rotation of said actuator means in a first rotation mode responsive solely to rotation of said handle portion about said longitudinal axis for differential actuation of such pair of actuatable means and axial rotation of said actuator means in a second rotation mode responsive solely to movements of said handle portion other than rotation of said handle portion about said longitudinal axis for concomitant actuation of such pair of actuatable means.

2. A control means as claimed in claim 1 additionally including support means for providing substantially the sole support for said control means by supportive engagement of said elongated rotary actuator means adjacent a portion thereof displaced laterally from said longitudinal axis of said handle portion.

3. The control means as claimed in claim 1 wherein said movements of said handle portion other than rotation of said handle portion about said longitudinal axis include rotation of said handle portion about a transverse axis means extending transversely of said longitudinal axis to concomitantly actuate such pair of actuatable means.

4. The control means as claimed in claim 3 wherein said elongated rotary actuator means includes at least a pair of coaxial, relatively rotatable shafts extending coaxially with respect to said transverse axis means, said first rotation mode being relative axial rotation of said coaxial shafts in opposite rotary directions and said second rotation mode being concomitant axial rotation of said coaxial shafts in the same rotary direction.

5. The control means as claimed in claim 4 wherein said rotary connector means includes angle drive gear means.

6. The control means as claimed in claim 5 wherein said angle drive gear means includes cooperably meshed bevel gears carried by said handle portion and by each of said coaxial shafts.

* * * * *